Dec. 24, 1929.  O. A. WIBERG  1,740,800
METHOD OF MAKING BLADE RINGS FOR RADIAL FLOW TURBINES
Filed July 16, 1926  3 Sheets-Sheet 1
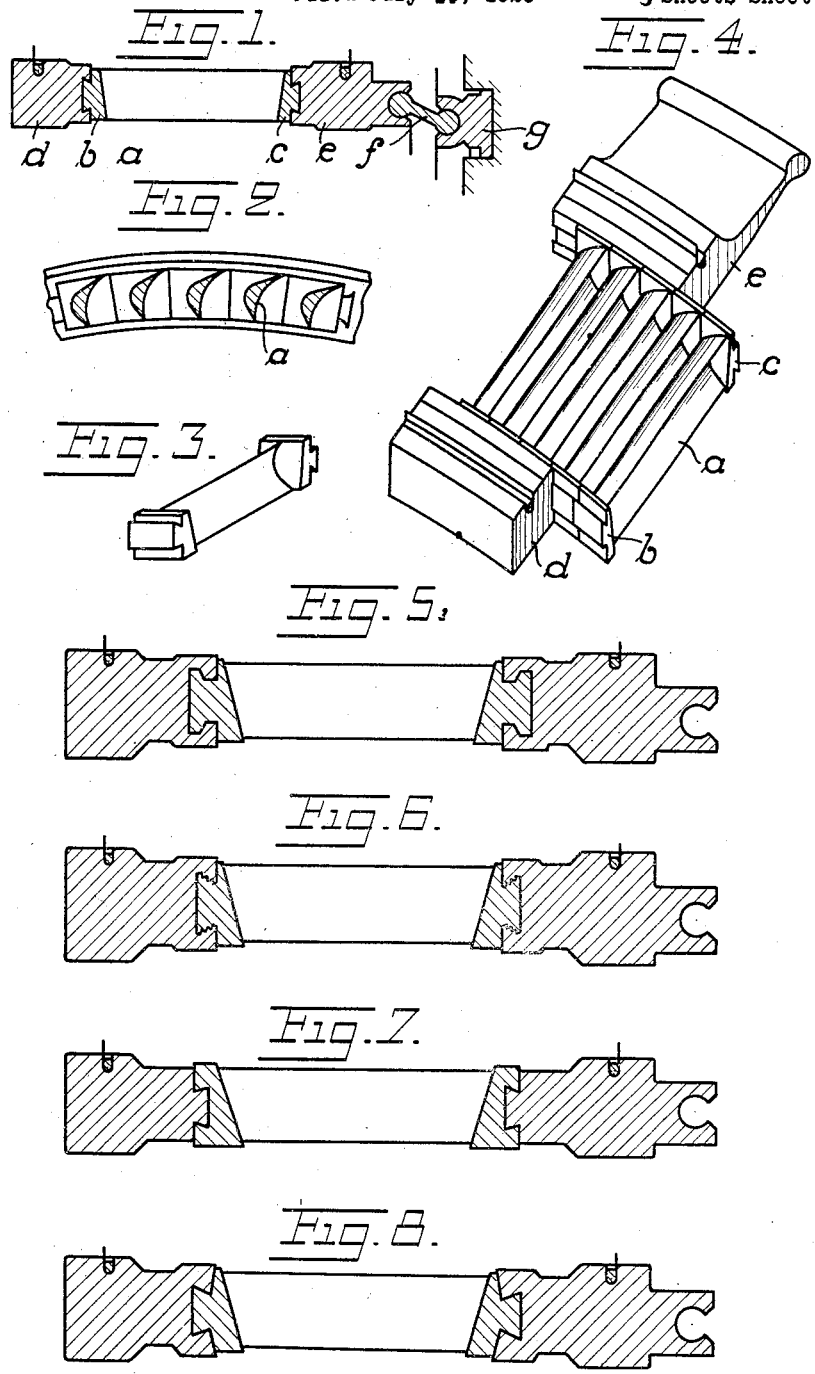
Inventor
Oscar A. Wiberg.

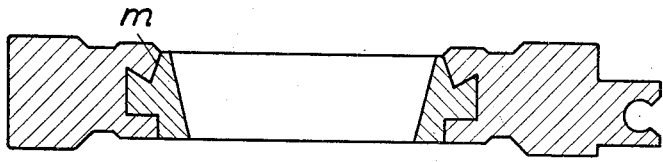
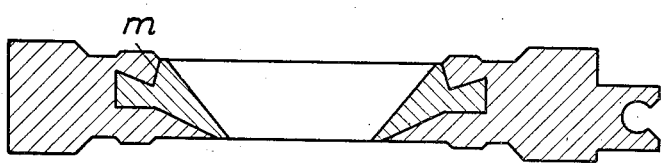
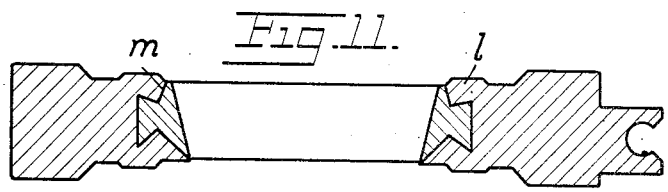
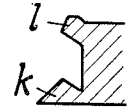
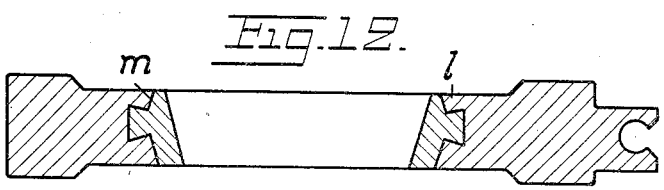
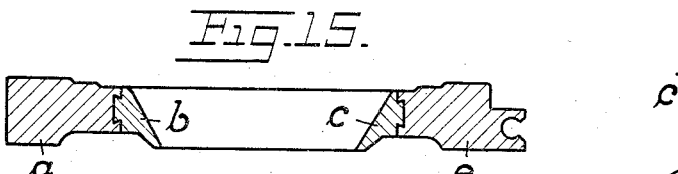
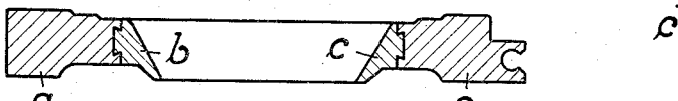
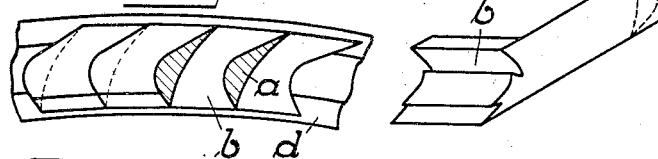

Dec. 24, 1929.  O. A. WIBERG  1,740,800
METHOD OF MAKING BLADE RINGS FOR RADIAL FLOW TURBINES
Filed July 16, 1926

Inventor,
Oscar A. Wiberg.

Patented Dec. 24, 1929

1,740,800

UNITED STATES PATENT OFFICE

OSCAR ANTON WIBERG, OF FINSPONG, SWEDEN

METHOD OF MAKING BLADE RINGS FOR RADIAL-FLOW TURBINES

Application filed July 16, 1926, Serial No. 122,833, and in Great Britain September 1, 1925.

This invention relates to improvements in and relating to blade rings of radial flow turbines and more particularly to the manufacture and assembling of blades to form such blade rings.

The object of the invention is to provide a simple method resulting in blade rings of a high resistance and strength as compared with rings manufactured in the usual way. Particularly, the invention has for its object to secure a stronger connection between the blades and their respective strengthening rings than heretofore thereby enabling an increased free length of blade.

A further advantage obtained by the improved manner of manufacture involves that the blades may be manufactured of a material difficult to solder or weld, as for instance rustless steel (stainless steel).

A still further advantage resides in the fact that the singly manufactured blades may be more accurately machined and more easily controlled in regard to the quality of the material. The steam or gas channel surfaces can consequently be polished, thereby reducing the steam or gas friction losses.

The invention is characterized, chiefly, in that the blades are each formed in a single piece with their roots said roots being provided with dove-tailed projections or notches which are thereupon connected by a rolling operation to the corresponding notches or projections, respectively, of the supporting rings.

In the accompanying drawing various forms of blades manufactured by the improved method are illustrated.

Fig. 1 is an axial section of a blade with supporting and expansion rings,

Fig. 2 is a section of part of the blade ring taken at right angles to the section of Fig. 1, Fig. 3 is a perspective view of a single blade, Fig. 4 is a perspective view of part of a blade ring illustrating the manner in which the blade ring is manufactured, while Figs. 5 to 12, inclusive, and Fig. 15 are axial sections of various forms of blades with their supporting rings.

Fig. 13 is a section of the supporting ring of Fig. 11 prior to the rolling operation. Fig. 14 is a similar section of a supporting ring of the blade shown in Fig. 12.

Fig. 16 is a perspective view of a modified embodiment of a blade manufactured in a single piece with its roots formed as spacing members.

Fig. 17 is an end view of a number of such blades, with part in section, inserted in a supporting ring.

Fig. 18 is a side elevation of a blade without spacing member. Fig. 19 is an end view of such blade. Fig. 20 is an elevation and Fig. 21 is an end view of a spacing member corresponding to the blade shown in Figs. 18 and 19.

Figure 22:
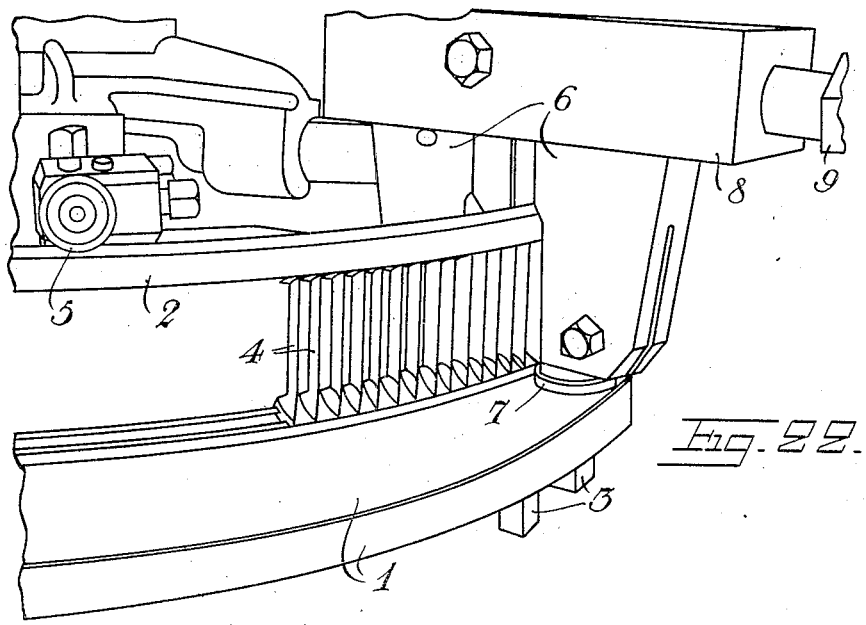

Fig. 22 is a perspective view of part of a rolling machine.

Figure 23:
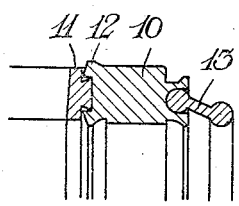
Figure 24:
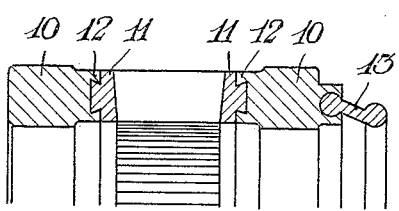

Figs. 23 and 24 show a blade ring prior to rolling and after rolling, respectively.

Figure 25:
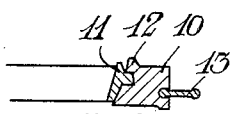
Figure 26:

Figs. 25 and 26 are similar views of a blade ring, having a unilateral dove-tailing.

With reference to Fig. 1, $a$ indicates the blade formed in a single piece with its roots $b$ and $c$ by a milling, hammering or similar operation. The roots are made in such a way that they form part of a ring sector. When the roots are placed together to form the blade ring the peripheral length of the roots determines the blade pitch. The blades, with a dove-tailed projection, adapted to form a blade ring are secured to strengthening or supporting rings $d$ and $e$ by rolling or pressing operations. One strengthening ring, as $e$, is connected by an expansion ring $f$ to a fastening ring $g$ in the usual way.

Fig. 3 shows how the roots $b$ and $c$ of the blade are cut, and Figs. 2 and 4 show how the cut surfaces of said roots bear against each other in the assembled blade ring, so that the peripheral length of the roots will determine the blade spacing.

Figs. 5 to 8 inclusive show various sectional forms of the roots of the blades.

Figs. 5, 6 and 8 illustrate the methods adapted where the strengthening rings are rolled or pressed above the blade roots, whereas Fig. 7 illustrates a method where the blade roots are rolled or pressed above the dove-tailed strengthening rings. The construction of the dove-tail is naturally executed to give the best possible connection between the strengthening rings and the blades. In order to increase the solidity of the connection, the dove-tail, as shown in Fig. 5, may be made claw-shaped, or, as shown in Fig. 6, in such way that a number of small grooves (knurling) are cut in the slanting faces of the dove-tails. Fig. 8 refers to a method where the material above the dove-tail is increased by the greater angle of engagement of the dove-tail (slanting faces) whereby the rolling or pressing operation is facilitated.

In the embodiments above described the dove-tailing is such as to require a rolling or pressing action to be effected on both sides of the supporting ring or blade root, respectively.

In Figs. 9 to 12 embodiments are shown only requiring an unilateral rolling operation.

Fig. 9 shows an embodiment having an unilateral dove-tailing inasmuch as the blade roots are formed with projections having an axially extending inner surface and an inclined outer surface. It is evident that in this case a rolling operation to secure the blade to the supporting ring should be effected on the outer surface of the supporting ring only.

Fig. 10 shows a similar embodiment having a higher degree of inclination on the side walls of the notch to receive the blades. This design is chosen with the object in view to reduce the weight of the blade to the largest extent possible at the same time increasing the cross sectional area of the supporting ring within the space available and rendering the blade elastic to a certain degree.

Figs. 11 and 12 show embodiments which while requiring an unilateral rolling operation will, nevertheless, present a complete dove-tailing. To this end the notches formed in the supporting rings to receive the dove-tailed projections are cut as shown in Figs. 13 and 14, respectively, that is, with one side wall $k$ of said notch in normal state and the other $l$ bent outwardly. The dovetailed projection is inserted in an oblique direction into the notch whereupon the wall $l$ is subjected to a rolling action to bring it into engagement with the corresponding side of the dove-tailed projection.

In the embodiments shown in Figs. 9 to 12 the surface $m$ at that side where the rolling operation is effected is inclined with the object in view to thereby facilitate proper engagement of the wall $l$ with the blade root without necessitating deformation of the material to such a high degree as would be necessary if the surface were radial.

Fig. 15 shows an embodiment in which the roots of the blades $b$, $c$ extend with a tapering portion inwardly beyond the inner surface of the supporting ring $a$, $e$, thereby rendering the blade elastic to a certain degree to allow it to automatically accommodate itself to the best power distribution.

In the above description it is assumed, see Figs. 2 to 4, that the integral roots of blades serving as spacing members extend to both sides of their respective blade.

In Fig. 16 there is shown a blade, the roots $b$, $c$ of which formed integral with the blade are formed as spacing members, though situated at one side of the blade only (e. g. the front side thereof) said spacing members being, moreover, so shaped as to fit exactly together with the rear side of the adjacent blade. As a result, the grinding of the rear side of the blade will be facilitated.

Fig. 17 shows a number of blades $a$ of the type, as shown in Fig. 16, successively inserted in a supporting ring. The character $b$ denotes the blade roots serving as spacing members.

It is to be noted that the roots of blades formed integrally with the blades may be ground to coincide with the blade both at its front and rear sides. In such case separate spacing members are required. Fig. 18 is a side elevation and Fig. 19 is an end view of such a blade.

Figs. 20 and 21 are side elevation and end view, respectively, of such a separate spacing member.

In order directly to secure a plurality of separate blades by rolling two rings some arrangements are required which are not self-evident, and to more clearly describe the method, reference may be had to Fig. 22 in which 1 designates the lower reinforcing ring which rests on supports 3 and is secured to a rotary table not shown. 2 designates the upper reinforcing ring. Inserted between the rings 1 and 2 are the blades 4 (all of which are not shown). The table rotates around a vertical shaft and takes the blades and reinforcing rings with it. Situated above said shaft are a number of centering arms carrying rolls 5 which may be adjusted for any size of rings. Said rolls are mounted so as to press downwardly in order to hold the reinforcing rings together with the blades in place therebetween. The lower reinforcing ring 1 is formed with a flange at its lower part to enable its securing to the table. This flange is turned off after the assembling operation is completed. Mounted in the frame of the machine are two claws 6 controlled by the clamping block 8 and its screw 9. At their lower ends the claws 6 carry rolls 7. Between said rolls the side walls of the groove of the reinforcing rings pass in the operation of the table to be pressed into engagement with the dove-tailings of the blades. The distance between the rolls 7 may be adjusted by the screw 9.

What I claim is:

1. A method of manufacturing blade rings for radial flow turbines which comprises taking separate pieces of material, forming the central portion of said material into buckets ending at a certain distance from both ends of the respective pieces, forming dove-tail projections on the outer surfaces of the remaining end portions, forming annular grooves in the opposite faces of two strengthening rings to receive said dovetail projections, bringing said projections into engagement with said grooves, and fastening the projections in said engagement by a rolling operation to form a unit blade ring structure that may be secured as a whole to a turbine wheel.

2. A method of manufacturing blade rings for radial flow turbines which comprises taking separate pieces of material, forming the central portion of said material into buckets ending at a certain distance from both ends of the respective pieces, forming the end pieces into spacing members, forming dove-tail projections on the outer surfaces of said spacing members, forming an annular groove in the opposite faces of strengthening rings to receive said dovetails, bringing said dove-tails into engagement with said grooves until spacing members of the various blades contact with each other, and sealing the dovetails in said engagement by a rolling operation to form unit blade ring structure that may be secured as a whole to a turbine wheel.

3. A method of manufacturing a turbine rotor which comprises forming each turbine blade separately with integral dovetail roots extending laterally of both faces of the blades at both ends of the latter, forming annular grooves in opposite faces of two strengthening rings to receive said roots, placing the roots in the annular grooves so that the roots form continuous rings, and swaging the sides of the grooves to the roots by subjecting said strengthening rings to a rolling operation.

4. A method of manufacturing a turbine rotor which comprises forming each turbine blade separately with integral dovetail roots extending laterally of both faces of the blades at both ends of the latter, forming annular grooves in opposite faces of two strengthening rings to receive said roots, placing the roots of adjacent blades together in the annular grooves so that the roots form continuous rings, and swaging the sides of the grooves to the roots by subjecting said strengthing rings to a rolling operation.

5. A method of manufacturing a turbine rotor which comprises forming each turbine blade with an integral spacing member at each end, each member extending laterally of both faces of the blades, forming each spacing member with a dovetail projection at its outer end, forming an annular groove in opposite faces of strengthening rings to receive said dovetails, mounting the spacing members of the various blades in said grooves in contact with each other to form continuous blade rings, and subjecting the strengthening rings to a rolling operation to form a swaged connection between said strengthening rings and the spacing members.

In testimony whereof I have signed my name.

OSCAR ANTON WIBERG.